United States Patent
Asai

(10) Patent No.: US 10,175,917 B2
(45) Date of Patent: Jan. 8, 2019

(54) MEDIUM STORING PROGRAM EXECUTABLE BY TERMINAL APPARATUS AND TERMINAL APPARATUS

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/465,036

(22) Filed: Mar. 21, 2017

(65) Prior Publication Data
US 2017/0277482 A1 Sep. 28, 2017

(30) Foreign Application Priority Data
Mar. 28, 2016 (JP) .................................. 2016-064192

(51) Int. Cl.
G06F 3/12 (2006.01)

(52) U.S. Cl.
CPC .......... *G06F 3/1206* (2013.01); *G06F 3/1247* (2013.01); *G06F 3/1256* (2013.01); *G06F 3/1292* (2013.01)

(58) Field of Classification Search
CPC .............................. G06F 3/1206; G06F 3/1247
See application file for complete search history.

(56) References Cited

U.S. PATENT DOCUMENTS

| 6,191,866 | B1 * | 2/2001 | Kim ........................ G06K 15/02 358/1.17 |
| 7,646,497 | B2 * | 1/2010 | Shima .................... G06F 3/1212 358/1.1 |
| 2010/0202015 | A1 * | 8/2010 | Misawa ............ G06F 17/30253 358/1.15 |
| 2012/0243039 | A1 * | 9/2012 | Miyata ............... H04N 1/00244 358/1.15 |
| 2014/0240762 | A1 | 8/2014 | Shiraga |
| 2015/0317115 | A1 | 11/2015 | Asai |

FOREIGN PATENT DOCUMENTS

| JP | 2003-216353 A | 7/2003 |
| JP | 2014-167735 A | 9/2014 |
| JP | 2015-210754 A | 11/2015 |

\* cited by examiner

*Primary Examiner* — Ibrahim Siddo
(74) *Attorney, Agent, or Firm* — Scully, Scott, Murphy & Presser, P.C.

(57) ABSTRACT

A non-transitory computer-readable medium stores a program executable by a terminal apparatus. The program causes the terminal apparatus to execute: a first determination processing for determining whether an operating system of the terminal apparatus can convert a format of content data from a first format into a second format; a first conversion processing for causing the operating system to convert the format of the content data from the first format into the second format, in response to a convertible determination made in the first determination processing; a second conversion processing for causing a server connected to the terminal apparatus to convert the format of the content data from the first format into the second format, in response to a non-convertible determination made in the first determination processing; and an output processing for outputting the content data in the second format converted in the first or second conversion processing.

13 Claims, 9 Drawing Sheets

Fig. 3A

| CONTENT DATA | NON-OUTPUT INFORMATION |
|---|---|
| RECIPE.pdf | OFF |
| MEMO.txt | ON |
| COOKING SCENE.jpg | - |
| ⋮ | ⋮ |

Fig. 3B

| CONVERSION DESTINATION INFORMATION | LOCAL / SERVER / AUTO |
|---|---|

MEDIUM STORING PROGRAM EXECUTABLE BY TERMINAL APPARATUS AND TERMINAL APPARATUS

CROSS REFERENCE TO RELATED APPLICATION

The present application claims priority from Japanese Patent Application No. 2016-064192 filed on Mar. 28, 2016 the disclosure of which is incorporated herein by reference in its entirety.

BACKGROUND

Field of the Invention

The present invention relates to a medium storing a program which is executable by a terminal apparatus, and the terminal apparatus. The program executable by the terminal apparatus causes a data outputting apparatus to output content data converted into a format which is outputtable by the data outputting apparatus.

Description of the Related Art

Conventionally, there is known a terminal apparatus which causes a printer to execute a printing operation. For example, a terminal apparatus described in Japanese Patent Application Laid-open No. 2014-167735 transmits a specified data specified (designated data designated) by a user to a cloud server on the Internet; receives, from the cloud server, the specified data converted into a format supported by the printer; and causes the printer to execute a printing operation with respect to the received specified data.

SUMMARY

In the above-described method, however, there is such a problem that the transmission and reception of the content data between the terminal apparatus and the cloud server on the Internet lowers the throughput from the instruction by the user to execute the printing operation until the printing operation is actually executed.

The present teaching has been made in view of the above-described situation, and object of the present teaching is to provide a terminal apparatus which is capable of efficiently executing a processing for converting and outputting content data, and a medium storing a program executable by such a terminal apparatus.

According to a first aspect of the present teaching, there is provided a non-transitory computer-readable medium storing a program executable by a terminal apparatus provided with a communication interface, the program causing the terminal apparatus to execute:

a first determination processing for determining whether an operating system of the terminal apparatus is capable of converting a format of content data from a first format into a second format, the first format being a format for which a data outputting apparatus is incapable of executing an outputting operation for outputting the content data, the second format being a format for which the data outputting apparatus is capable of executing the outputting operation;

a first conversion processing for causing the operating system to convert the format of the content data from the first format into the second format, in response to a convertible determination made in the first determination processing that the operating system is capable of converting the format of the content data from the first format into the second format;

a second conversion processing for causing a server to convert the format of the content data from the first format into the second format, in response to a non-convertible determination made in the first determination processing that the operating system is incapable of converting the format of the content data from the first format into the second format, the server being connected to the terminal apparatus via the communication interface; and an output processing for outputting the content data in the second format converted in the first conversion processing or the second conversion processing.

According to a second aspect of the present teaching, there is provided a terminal apparatus comprising:

a communication interface; and
a controller configured to execute:
a first determination processing for determining whether an operating system of the terminal apparatus is capable of converting a format of content data from a first format into a second format, the first format being a format for which a data outputting apparatus is incapable of executing an outputting operation for outputting the content data, the second format being a format for which the data outputting apparatus is capable of executing the outputting operation;

a first conversion processing for causing the operating system to convert the format of the content data from the first format into the second format, in response to a convertible determination made in the first determination processing that the operating system is capable of converting the format of the content data from the first format into the second format;

a second conversion processing for causing a server to convert the format of the content data from the first format into the second format, in response to a non-convertible determination made in the first determination processing that the operating system is incapable of converting the format of the content data from the first format into the second format, the server being connected to the terminal apparatus via the communication interface; and an output processing for outputting the content data in the second format converted in the first conversion processing or the second conversion processing.

The function implemented in the operating system is increased accompanying with the version upgrade (version-up), etc. of the operating system. In view of this, the above-described configuration causes the operating system to execute the conversion processing in a case that the conversion function from the first format into the second format is implemented in the operating system; whereas the configuration causes the server to execute the conversion processing in a case that the conversion function is not implemented in the operating system. With this, the communications traffic between the terminal apparatus and the server can be reduced, thereby making it possible to efficiently execute the processing for converting the content data and the processing for outputting the content data.

BRIEF DESCRIPTION OF THE DRAWINGS

FIGS. 3A and 3B depict an example of stored data in a memory, wherein FIG. 3A depicts content data and non-output information corresponding to each other, and FIG. 3B depicts conversion destination information.

FIGS. 6A and 6B each depict a display example of a display, wherein FIG. 6A depicts a data selection screen, and FIG. 6B depicts a preview screen including a [Print] icon which is enabled (made effective).

FIGS. 7A and 7B each depict a display example of the display, wherein FIG. 7A depicts a preview screen including the [Print] icon which is disabled (made ineffective) and an [END] icon, and FIG. 7B depicts an inquiry screen.

DESCRIPTION OF THE EMBODIMENTS

In the following, an embodiment of the present teaching will be explained, with reference to the drawings as appropriate. It is needless to say that the embodiment to be explained below is merely an example of the present teaching, and that it is possible to appropriately change the embodiment of the present teaching without departing from the gist and scope of the present teaching. For example, it is possible to change the execution sequence for executing respective processings to be described later on as appropriate, without departing from the gist and scope of the present teaching.

Figure 1:
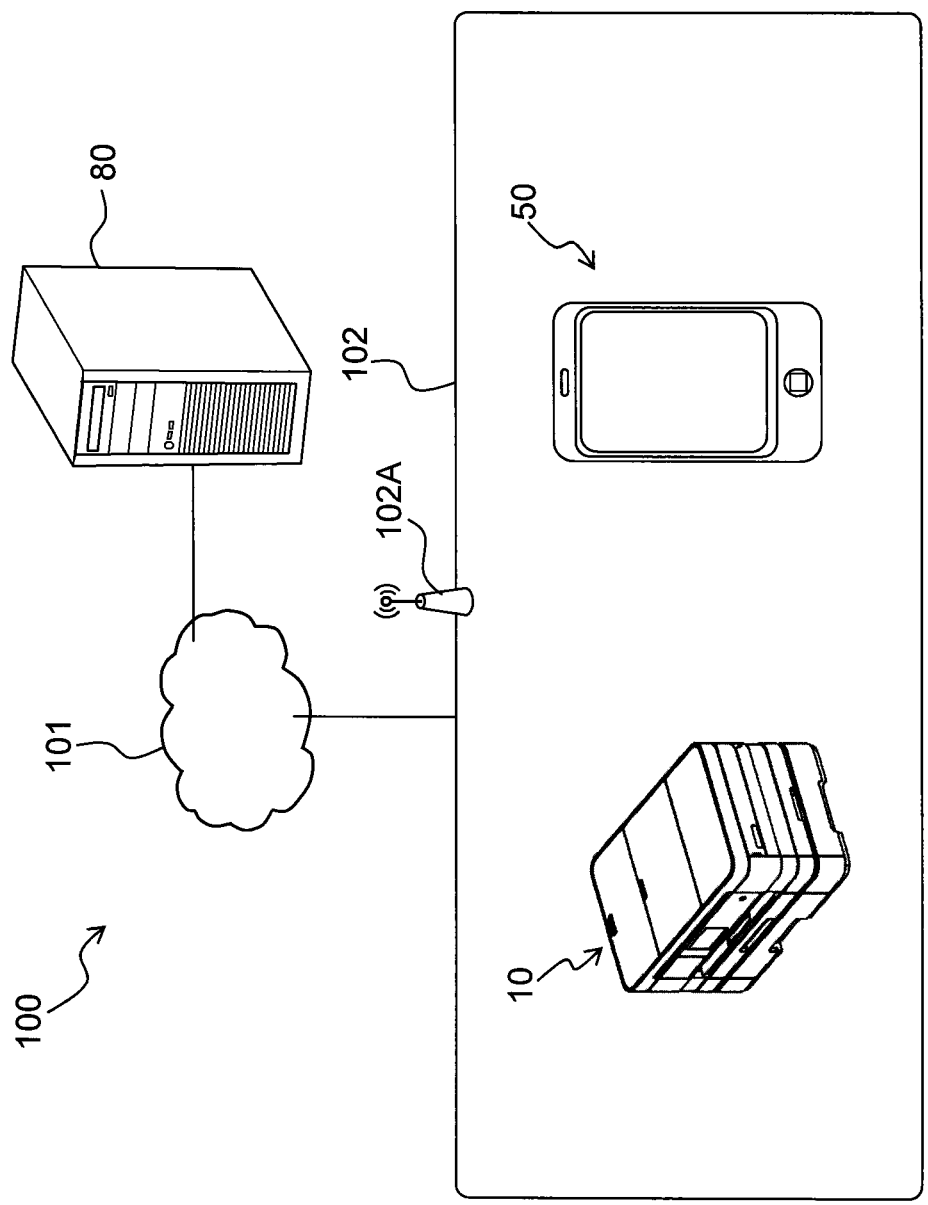
FIG. 1 is a schematic diagram of a system according to an embodiment of the present teaching.

A system 100 depicted in FIG. 1 is composed of a multi-function peripheral 10, a terminal apparatus 50 and a server 80. The multi-function peripheral 10, the terminal apparatus 50 and the server 80 are configured to be communicatable with one another via a communication network. Although the specific examples of the communication network are not particularly limited, the communication network may be, for example, Internet 101, a wired LAN, a wireless LAN 102, or a combination thereof.

The multi-function peripheral 10 and the terminal apparatus 50 belong to the wireless LAN 102. Namely, the multi-function peripheral 10 and the terminal apparatus 10 can communicate to each other via a non-illustrated access point of the wireless LAN 102. Further, the wireless LAN 102 is connected to the Internet 101 via a router 102A. Furthermore, the server 80 is connected to the Internet 101. Namely, the multi-function peripheral 10 and the terminal apparatus 50 can communicate with the server 80, by means of the router 102A and via the Internet 101.

Figure 2A:
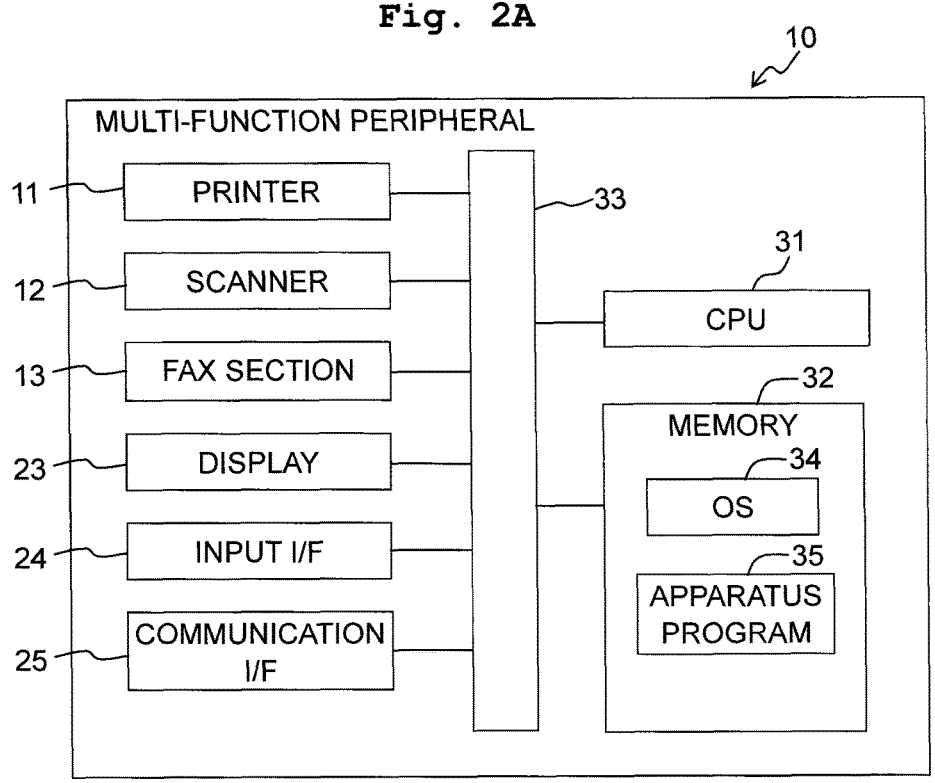
FIG. 2A is a block diagram of a multi-function peripheral.

The multi-function peripheral 10 mainly includes a printer 11, a scanner 12, a FAX section 13, a display 23, an input I/F 24, a communication I/F 25, a CPU 31, a memory 32 and a communication bus 33, as depicted in FIG. 2A. The respective constituent elements constructing the multi-function peripheral 10 are connected to one another via the communication bus 33. The multi-function peripheral 10 is an example of a data outputting apparatus or an image outputting apparatus.

The printer 11 executes a printing operation for recording, on a sheet, an image indicated or shown by an image data. As the recording system of the printer 11, it is possible to adopt any publicly known system such as the ink jet system, the electro-photographic system, etc. The scanner 12 executes a scanning operation for reading an image, etc. recorded on a manuscript (original) and generating an image data. The FAX section 13 executes a FAX transmitting operation and a FAX receiving operation for transmitting and receiving an image data by a system based on a FAX protocol. The printing operation and the FAX transmitting operation are each an example of an outputting operation. Note that a part of the printer 11, the scanner 12 and the FAX section 13 may be omitted.

The display 23 is a liquid crystal display, an organic EL display, etc., and is provided with a display surface configured to display a variety of kinds of informations. The display 23 is an example of a notifying section. Note that, however, the specific examples of the notifying section are not limited to the display 23, and may be a non-illustrated speaker or LED lamp installed in the multi-function peripheral 10, etc.

The input I/F 24 is a user interface via which an inputting operation by a user is received. Specifically, the input I/F 24 has a button or buttons, and outputs a variety of kinds of operation signals, each of which corresponds to a button pushed or depressed for example by the user, to the CPU 31. Further, the input I/F 24 may have a film-shaped touch sensor superimposed on the display surface of the display 23. An operation for specifying (designating) an object displayed on the display surface of the display 23, and an operation for inputting a character string or digit sequence are each an example of a user operation. The term "object" includes, for example, a character string, an icon, a button, a link, etc., displayed on the display 23.

The input I/F 24 embodied as a touch sensor outputs positional information indicating the position or location, on the display surface, touched by the user. Note that the term "touch" in the present specification includes an entire operation for allowing an input medium to touch the display surface. Further, even a "hover" or "floating touch", in which the input medium does not touch the display surface but the input medium is located at a position closely to the display surface such that the distance therebetween is very small, may be encompassed in the concept of the above-described "touch". Furthermore, the input medium may be a finger of a user, a touch pen, etc. The user operation for tapping a location (position), on the display 23, at which an icon is displayed is an example of a specifying operation for specifying the said icon.

The communication I/F 25 is an interface capable of communicating with an external apparatus or device via the communication network. Namely, the multi-function peripheral 10 transmits a various kinds of informations to the external apparatus via the communication I/F 25, and receives a variety of kinds of informations from the external apparatus via the communication IN 25. Although the specific communication protocol of the communication I/F 25 is not particularly limited, it is possible to adopt, for example, Wi-Fi (trade name of Wi-Fi Alliance). Further, in a case that the multi-function peripheral 10 and the terminal apparatus 50 are connected by a USB cable, the communication I/F 25 may be a USB interface to which the USB cable is attached and from which the USB cable is detached.

The CPU 31 controls the overall operation of the multi-function peripheral 10. The CPU 31 obtains a variety of kinds of programs (to be described later on) from the memory 32 and executes the programs, based on a variety of kinds of informations outputted from the input I/F 24, a variety of kinds of informations received from the external apparatus via the communication I/F 25, etc. The CPU 31 and the memory 32 construct an example of a controller.

The memory 32 stores an OS 34 and an apparatus program 35. The apparatus program 35 may be a single program, or an aggregate of a plurality of programs. Further, the memory 32 stores a data or information, etc., required for executing the apparatus program 35. The memory 32 is constructed, for example, of a RAM, a ROM, a EEPROM, a HDD, a portable storage medium such as an USB memory attachable/detachable with respect to the multi-function peripheral 10, a buffer provided on the CPU 31, etc., and a combination of the above-described parts or elements.

The memory 32 may be a computer-readable storage medium which is readable by a computer. The term "computer-readable storage medium" is a non-transitory medium. The non-transitory medium includes, other than those exemplified above, recording media such as a CD-ROM, a DVD-ROM, etc. Further, the non-transitory medium is also a tangible medium. On the other hand, although an electric signal transmitting a program which is downloaded from, for example, a server on the Internet 101 is a computer-readable signal medium as a kind of a computer-readable medium readable by a computer, such an electric signal is not included in the non-transitory and computer-readable storage medium. This is also applicable to a memory 62 of the terminal apparatus 50 (to be described later on), in a similar manner.

Figure 2B:
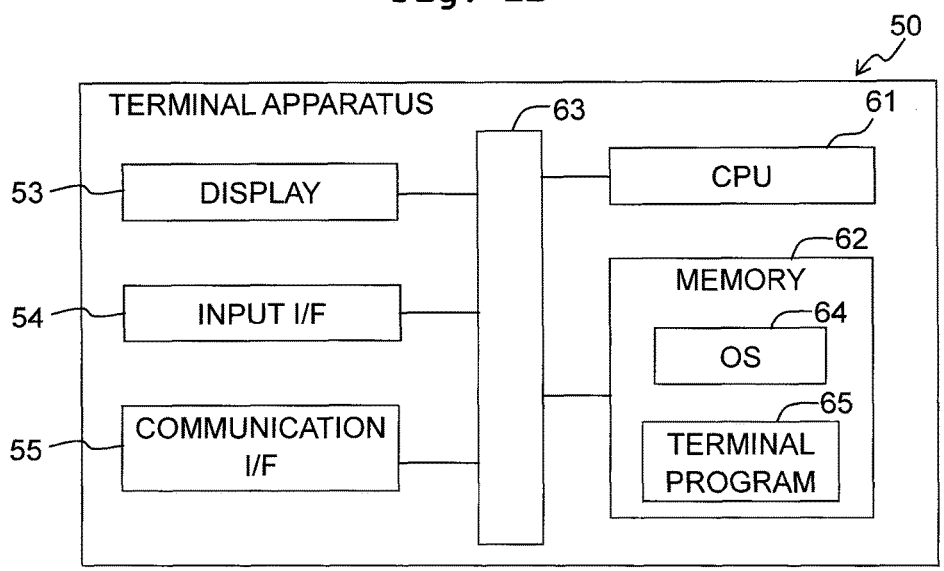
FIG. 2B is a block diagram of a terminal apparatus.
Figure 4A:
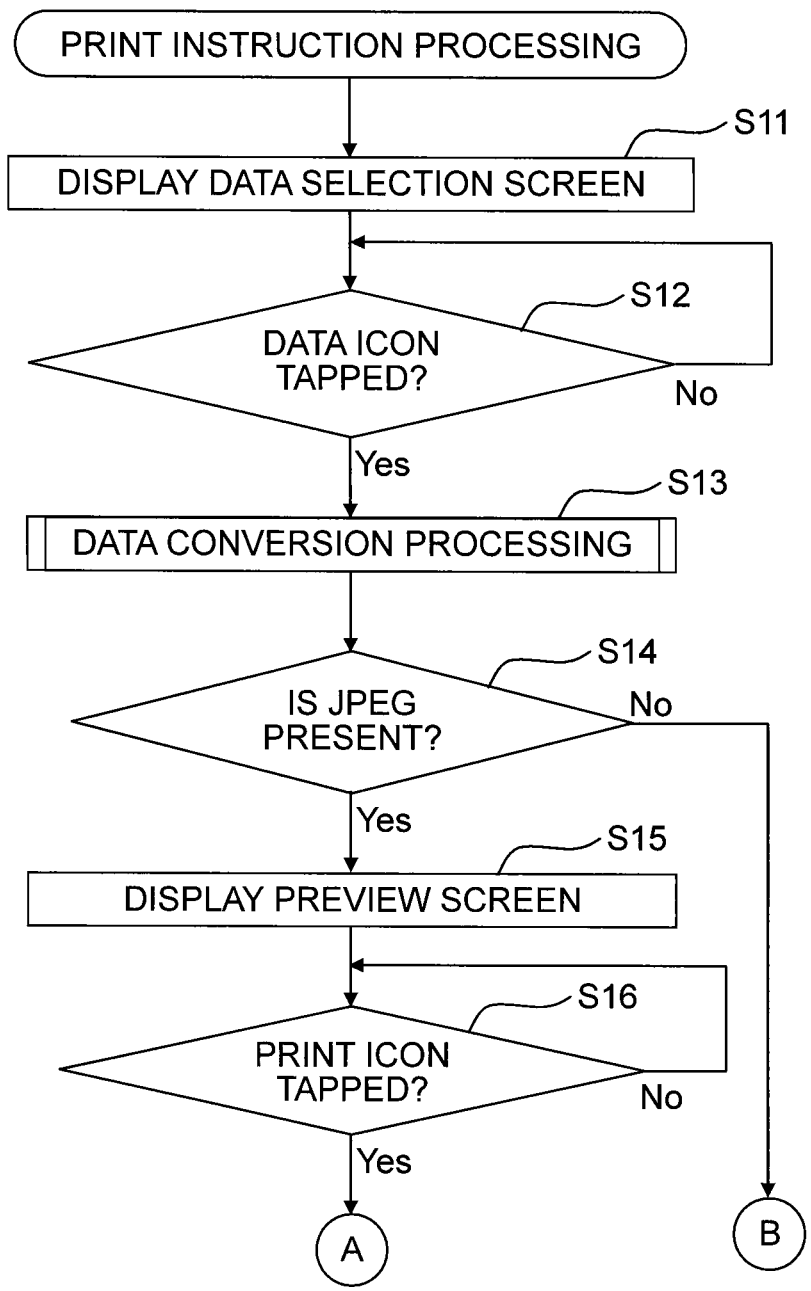
FIGS. 4A and 4B depict a flow chart of print instruction processing.
Figure 4B:
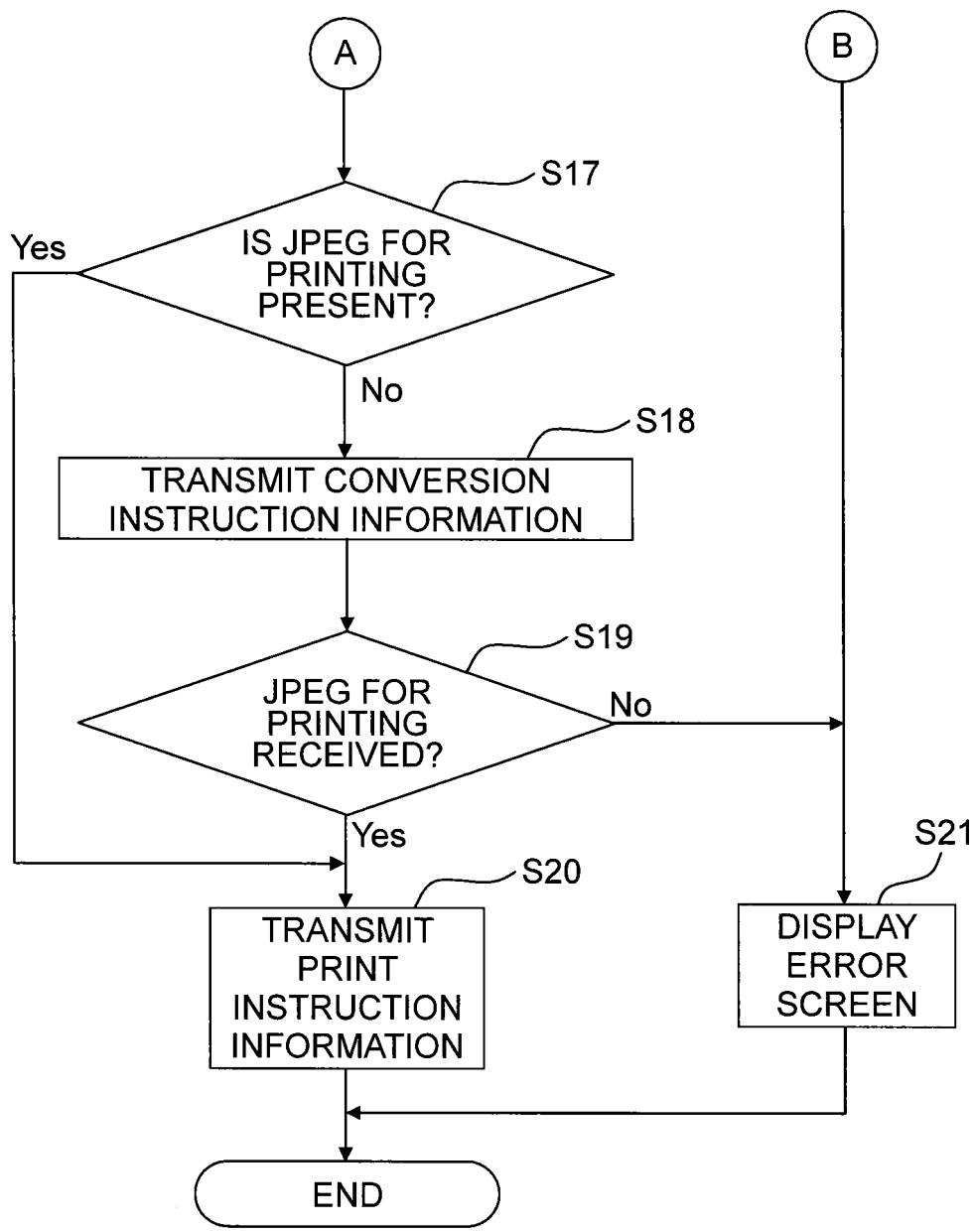

The terminal apparatus 50 mainly includes a display 53, an input I/F 54, a communication I/F 55, a CPU 61, a memory 62, and a communication bus 63, as depicted in FIG. 2B. The display 53, the input I/F 54, the communication I/F 55, the CPU 61, the memory 62 and the communication bus 63 included in the terminal apparatus 50 are constructed similarly respectively to the display 23, the input I/F 24, the communication I/F 25, the CPU 31, the memory 32 and the communication bus 33, and any explanation therefor will be omitted. The CPU 61 and the memory 62 construct an example of the controller.

The terminal apparatus 50 is, for example, a mobile phone, a smart phone, or a tablet terminal, or a PC, etc. More specifically, the display 53 of the terminal apparatus 50 has a display screen of which size is preferably not more than 12 inch, more preferably not more than 8 inch. Further, the input I/F 54 of the terminal apparatus 50 is preferably a touch sensor overlaid onto the display screen of the display 53.

The memory 62 stores an operating system (OS) 64 and a terminal program 65. The OS 64 may be, for example, Android (trade name of GOOGLE INC.) OS, iOS (trade name of CISCO SYSTEMS, INC.), Windows Phone (trade name of MICROSOFT CORPORATION) Operating System, etc. The version of the OS 64 installed in the terminal apparatus 50 is upgraded at a predetermined timing.

The term "upgrade of version (or version up)" includes, for example, adding a new function to the OS 64, modifying an existing function of the OS 64, etc. The OS 64 receives, for example, a new module from a non-illustrated server on the Internet 101 via the communication I/F 55. Further, the OS 64 causes the memory 62 to newly store the received new module, or to overwrite an old module already stored in the memory 62 with the new module. By doing so, the version of the OS 64 is upgraded. The terminal program 65 is capable of obtaining the version of the OS 64 by, for example, calling a query API provided by the OS 64.

In the embodiment, the OS 64 of which version is less than version 5 is not capable of executing a conversion processing for converting the format of the content data from the first format into the second format. Further, the OS 64 of which version is not less than version 5 and less than version 6 is capable of executing the conversion processing in a case that (under a condition that) the content data does not contain any non-convertible data (to be described later on). Furthermore, the OS 64 of which version is not less than version 6 is capable of executing the conversion processing regardless of whether or not the content data contains the non-convertible data. The version 5 is an example of a first threshold value, and the version 6 is an example of a second threshold value.

The first format is a format for which the multi-function peripheral 10 is not capable of executing the outputting operation, and is exemplified by formats indicated by extensions such as ".pdf", ".txt", ".doc", ".xls", ".ppt", etc. The second format is a format for which the multi-function peripheral 10 is capable of executing the outputting operation, and is exemplified by formats indicated by extensions such as ".jpg", ".bmp", etc. Note that the first format and the second format may be different for every multi-function peripheral 10. Further, the terminal program 65 may receive information indicating the first format and information indicating the second format from the multi-function peripheral 10, or from a non-illustrated server which stores the information indicating the first format and the information indicating the second format while correlating with the model name of the multi-function peripheral 10.

Note that the phrase "converting the format of the content data" is, for example, a processing for converting the format of the data from the first format into the second format without substantially changing (modifying) the content of an image indicated by the content data before the conversion. The specific method for executing the conversion processing is already well-known, and thus any detailed explanation therefor will be omitted. The terminal program 65 is capable of causing the OS 64 to execute the conversion processing by, for example, calling a conversion API provided by the OS 64. In the embodiment, the following processing will be explained, with the JPEG format being considered as the second format.

Further, as depicted in FIG. 3A, the memory 62 may contain data folders storing a plurality of pieces of the content data such as a photo data, a document data, a presentation data, a spreadsheet data, etc., respectively. Further, the content data may be associated with non-output information indicating whether or not an output processing with respect to the content data is permitted. A first value "OFF" corresponding to an instruction for permitting the outputting operation for a content data corresponding thereto or a second value "ON" corresponding to an instruction restricting (regulating, prohibiting) the outputting operation for outputting the content data corresponding thereto is set to the non-output information. The terminal program 65 set a value, for example, designated or specified by the user via the input I/F 54, to the non-output information. Note that the content data and the non-output information may be stored in a non-illustrated storage server, instead of being stored in the memory 62.

Furthermore, as depicted in FIG. 3B, the memory 62 is capable of storing conversion destination information. The conversion destination information is information indicating a device which is (to be) caused to execute the conversion processing for converting the content data in the first format into the content data in the second format. A third value "Local" corresponding to an instruction for causing the terminal apparatus 50 to execute the conversion processing, a fourth value "Server" corresponding to an instruction for causing the server 80 to execute the conversion processing, or a fifth value "Local Preferred" corresponding to an instruction for causing the terminal apparatus 50 to execute the conversion processing preferentially to the server 80 is set to the conversion destination information. For example, the terminal program 65 sets, to the conversion destination information, a value which has been previously designated by the user via the input I/F 54 in a non-illustrated setting screen of the terminal program 65 before the terminal program 65 executes the conversion processing for converting the content data in the first format into the content data in the second format.

The server 80 is capable of executing the conversion processing for converting the format of the content data from the first format into the second format. More specifically, the server 80 receives conversion instruction information from the terminal apparatus 50, converts the format of the content data included in the received conversion instruction information from the first format into the second format, and transmits the content data in the second format to the terminal apparatus 50. Note that the conversion processings executed by the OS 64 of the terminal apparatus 50 and by the server 80 respectively may be realized by a same algorithm, or by different algorithms, respectively.

<Operation of System 100>

An explanation will be given about an operation of the system 100 according to the embodiment, with reference to FIGS. 4A, 4B, 5A, and 5B.

Flowcharts described in the present specification basically indicate processings of the CPU 31 and/or CPU 61, respectively, each in accordance with an instruction described in a program. Namely, the processings such as "determining", "extracting", "selecting", "calculating", "specifying", "controlling", etc., in the following explanation represent the processings of the CPU 31 and/or the CPU 61. The processings by the CPU 31 and/or CPU 61 also include hardware controls via the OS 34 and/or OS 64, respectively. Further, the term "data" in the present specification is represented by a bit sequence which is readable by a computer. Furthermore, a plurality of pieces of data of which substantive meanings and contents are same but are different in format thereof are handled as a same data. This also applies similarly to the term "information" in the present specification.

Figure 6B:
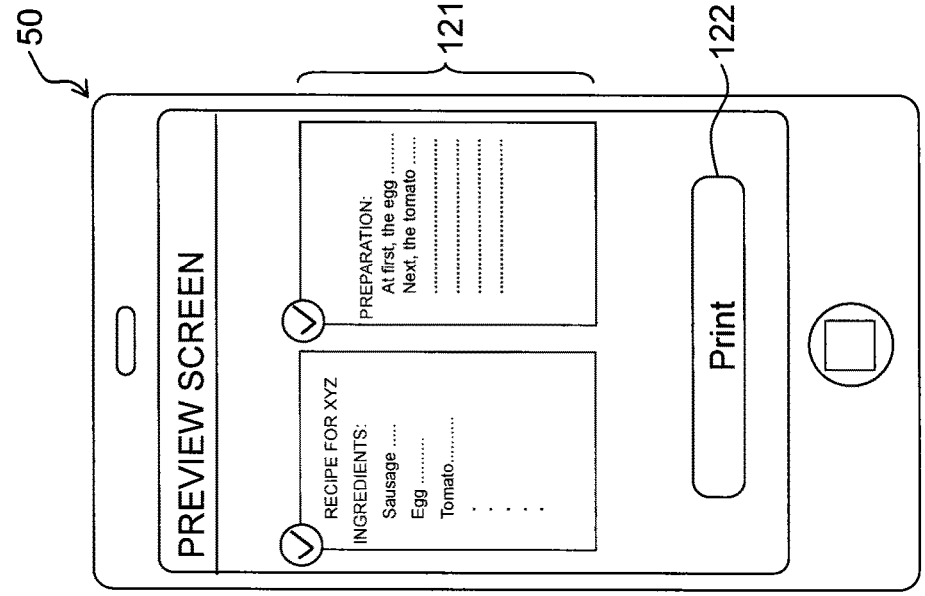
Figure 6A:
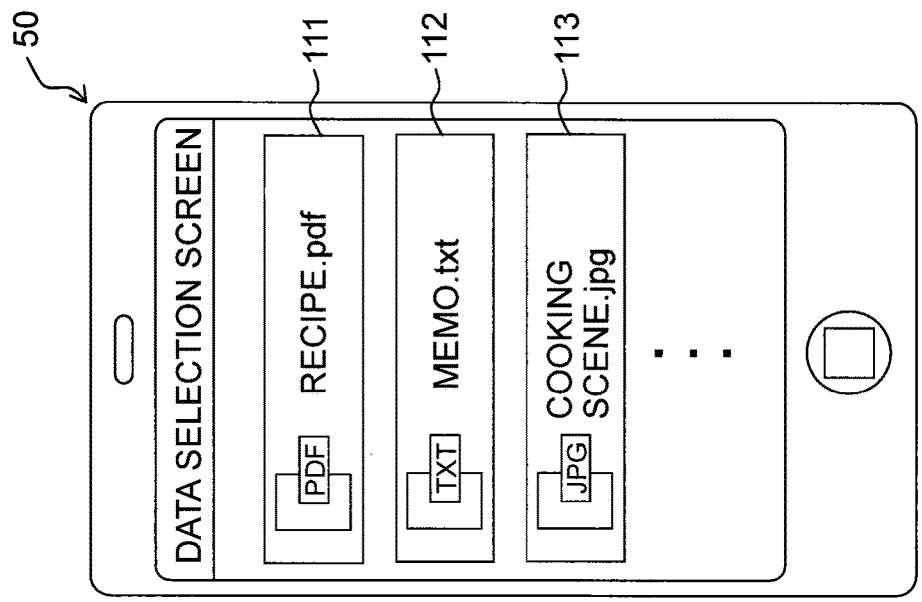

At first, in response to the activation of the terminal program 65 triggered by, for example, a user operation by the user via the input I/F 54, the terminal program 65 causes the display 53 to display a data selection screen as depicted in FIG. 6A, (S11). The data selection screen is a screen to urge (the user) to specify (identify) a specified data as an object for the outputting operation. Note that the displaying of the data selection screen is not limited to a point of time immediately after the activation of the terminal program 65, and may be a timing at which a user operation, instructing that the data selection screen to be displayed, is received via the input I/F 54. Further, the terminal program 65 receives a user operation with respect to the data selection screen via the input I/F 54 (S12).

The data selection screen includes data icons 111, 112 and 113 corresponding to a plurality of pieces of the content data which are stored in the data folders. The data icon 111 corresponds to a content data "recipe.pdf", the data icon 112 corresponds to a content data "memo.txt", and the data icon 113 corresponds to a content data "cooking scene.jpg". Each of the data icons 111 to 113 includes a format image indicating the format of the content data corresponding thereto (for example, an image including a character string such as "PDF", "TXT", "JPG", etc.), and data identification information of the content data corresponding thereto.

Next, for example, in response to the receipt of the specification (identification) of the data icon 111 via the input I/F 54, the terminal program 65 determines the content data "recipe.pdf", which corresponds to the data icon 111, as the specified data. More specifically, the terminal program 65 causes the memory 62 to temporarily store the data identification information of the specified data. Tapping of the data icon 111 is an example of a specifying operation for specifying the specified data.

Figure 5A:
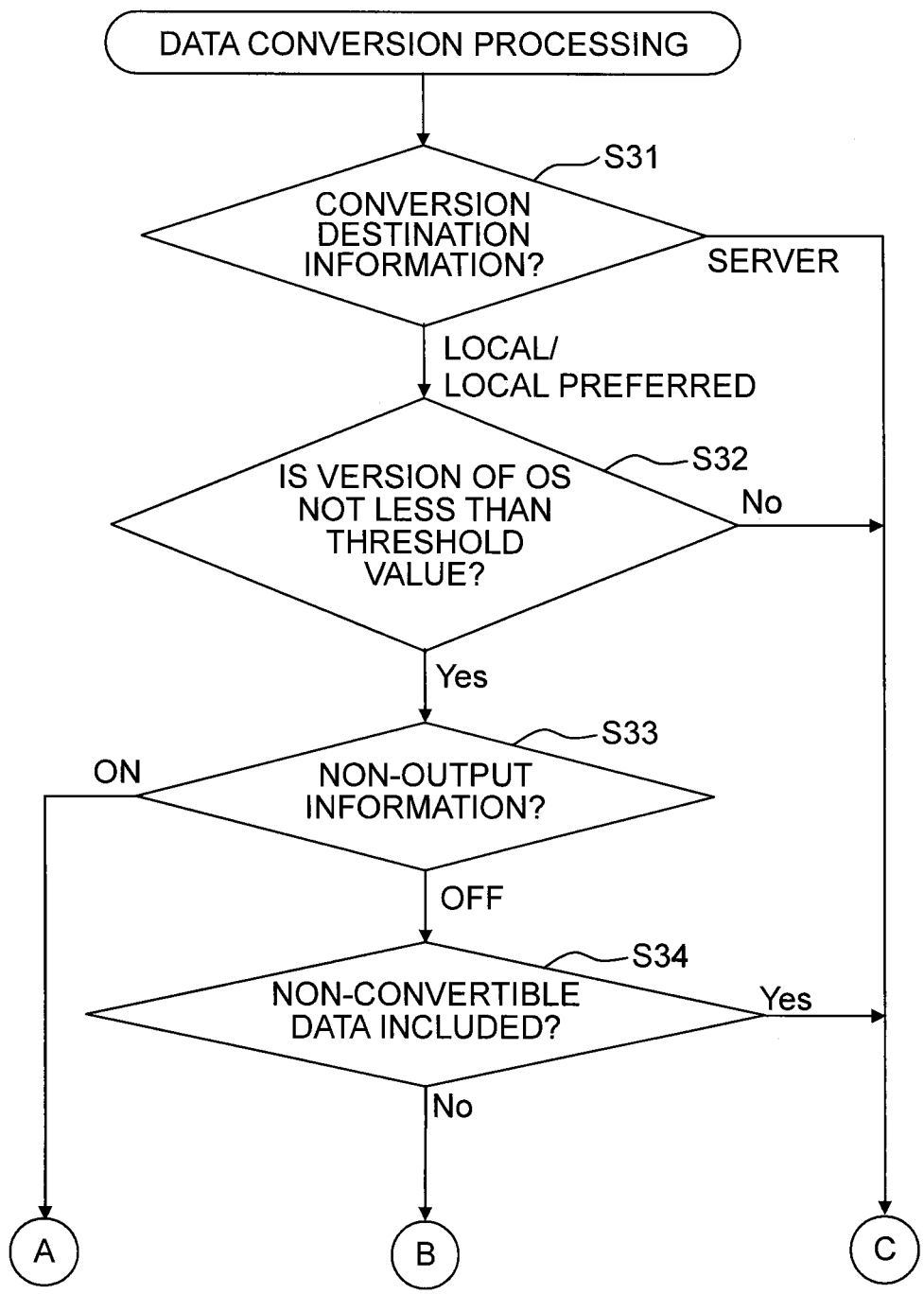
FIGS. 5A and 5B depict a flow chart of data conversion processing.
Figure 5B:
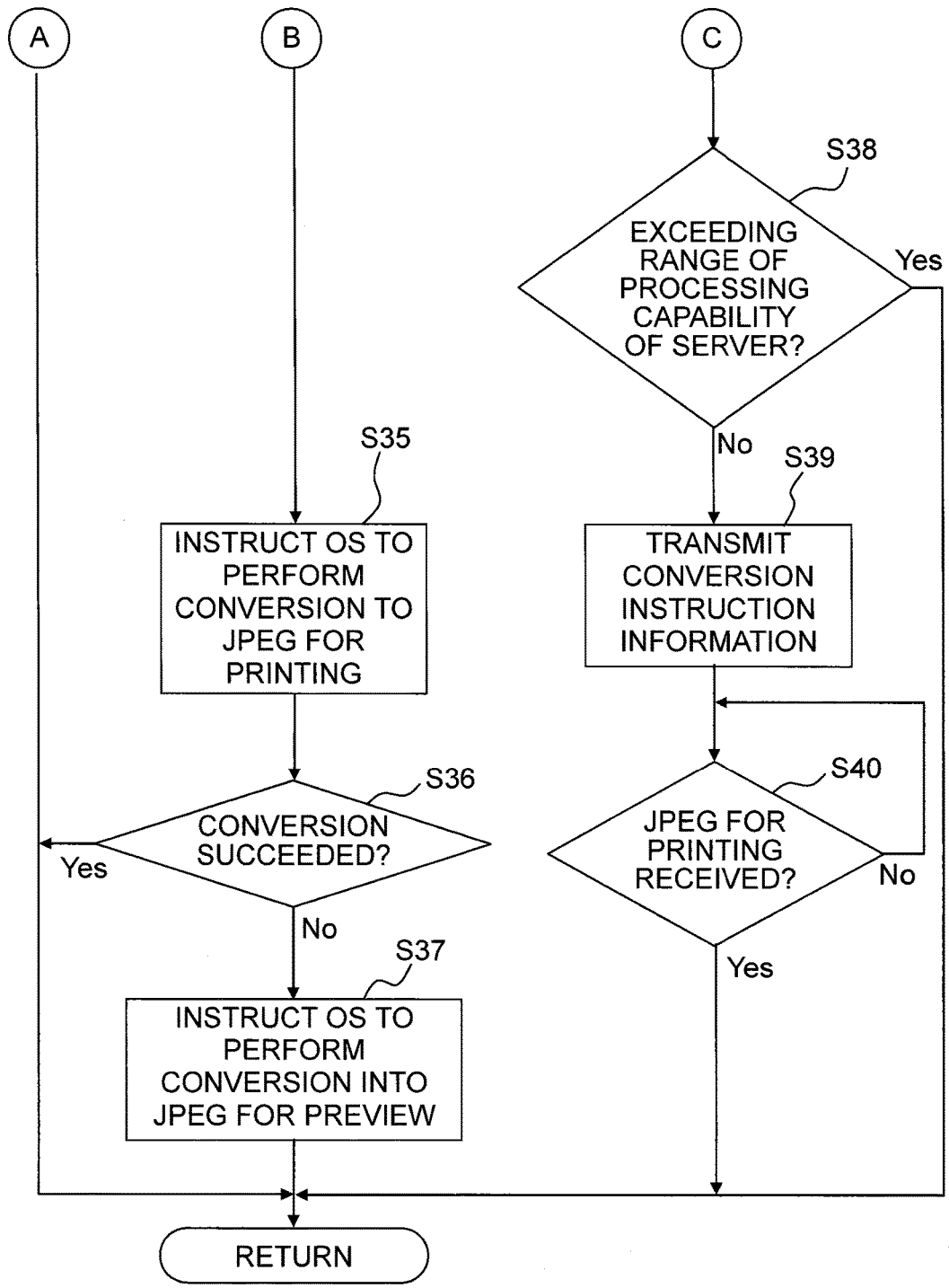

Next, the terminal program 65 executes the data conversion processing (S13). The data conversion processing is a processing for converting the specified data in the first format into that in the second format (converting the format of the specified data from the first format into the second format). In a case that a content data in the second format is determined as the specified data in the step S12, the processing in step S13 and the processings in steps S17 to S19 (to be described later on) are omitted. With reference to FIGS. 5A and 5B, the details of the data conversion processing will be explained.

At first, the terminal program 65 makes determination regarding the set value of the conversion destination information stored in the memory 62 (S31). Further, the terminal program 65 determines whether or not the OS 64 is capable of executing the conversion processing (S32). More specifically, the terminal program 65 compares the current version of the OS 64 and the first and second threshold values. Further, the terminal program 65 makes determination regarding the set value of the non-output information stored in the memory 62 while being made to correspond to (while being associated with) the specified data (S33). The processing in step S31 is an example of a fourth determination processing, the processing in step S32 is an example of a first determination processing, and the processing in step S33 is an example of a third determination processing.

Next, in response to the third value "Local" or the fifth value "Local Preferred" being set in the conversion destination information, the version of the OS 64 being not less than the first threshold value and being less than the second threshold value, and the first value "OFF" being set in the non-output information (S31: Local/Local Preferred & S32: Yes & S33: OFF), the terminal program 65 determines whether or not the specified data includes an non-convertible data (S34). The terminal program 65 is capable of determining the presence or absence of the non-convertible data by, for example, analyzing the specified data. The processing in step S34 is an example of a second determination processing.

The non-convertible data is a data which is included in the specified data and which cannot be converted (which is non-convertible) into the second format. More specifically, the non-convertible data is a data incapable of being converted into the second format by the OS 64 of which version is less than the second threshold value, and is a data capable of being converted into the second format by the OS of which version is not less than the second threshold value and by the server 80. Although specific examples of the non-convertible data are not particularly limited, the non-convertible data can be exemplified, for example, by a specific font (for example, ANSI), an object receiving an user operation via the input I/F 54 (for example, a check box, a radio button, etc.).

Further, in response to the determination made by the terminal program 65 that the specified data does not include the non-convertible data (S34: NO), the terminal program 65 causes the OS 64 to execute the conversion program for the specified data (S35). More specifically, the terminal program 65 calls a conversion API, with a first pointer indicating the starting address in a memory area in which the specified data is stored and resolution information indicating an output resolution, as arguments. The output resolution may be a fixed value set in the terminal program 65, or may be value set by the user via the input I/F 54. The processing in step S35 is an example of a first conversion processing.

In response to the conversion API having been called, the OS 64 reads out the specified data from the memory area indicated by the first pointer designated as the argument, and develops the specified data which has been read in a work area of the memory 62 which is secured by the OS 64. Further, the OS 64 converts the specified data developed in the work area from the first format into the second format, by a predetermined algorithm. Here, the work area required for the conversion processing becomes greater as the data amount (data volume) of the specified data is greater, and there is such a tendency that the work area becomes greater as the resolution indicated by the resolution information designated as the argument is greater. Furthermore, the size of the work area changes during the execution of the conversion processing, in some cases.

Moreover, in response to a normal termination of the conversion processing, the OS 64 causes the memory 62 to store the specified data which is in the second format and which indicates an image having the output resolution (hereinafter referred to as "JPEG for Printing") with a second pointer indicating the starting address of the JPEG for Printing as the return value, and the OS 64 completes the conversion API. On the other hand, in response to any abnormal termination of the conversion processing, the OS 64 ends the conversion API, with error information indicating the cause of the error as the return value. In such a case, the first conversion processing is stopped, and any specified data in the second format is not generated. The error information indicates a cause for the abnormal end including, for example, such a situation or state that any non-convertible data is included in the specified data, available capacity of the memory 62 becomes lower than a required capacity during the conversion processing, etc.

Next, the terminal program 65 obtains the return value of the conversion API. Further, in response to the obtaining the second pointer as the return value (S36: Yes), the terminal program 65 ends the data conversion processing. The obtaining of the second pointer is an example of obtaining the specified data in the second format. On the other hand, in response to the obtaining of the error information as the return value (S36: No), the OS 64 calls the conversion API, with the first pointer and resolution information indicating a preview resolution, as arguments (S37). The preview resolution is a resolution lower than the output resolution, and may be a fix value, or a value set by the user. The processing in step S37 is an example of a third conversion processing.

Note that the processing in step S37 may be executed regardless of the content (feature) of an error indicated by the error information, or may be executed only under a condition that the error information indicates a specific error. In the embodiment, in a case that the error information indicates shortage of the memory (insufficient memory), the processing in step S37 is to be executed. Further, in the processing in step S37, the capacity of the memory required for the conversion processing is smaller than that required for the processing in the step S35; thus, even in a case that the conversion processing in step S35 is abnormally ended, there is such a possibility that the conversion processing in step S37 might end normally.

Furthermore, the terminal program 65 ends the data conversion processing, in response to the obtaining, as the return value, of a second pointer indicating the starting address in a memory area in which the specified data is stored, the specified data being in the second format and indicating an image of which resolution is the preview resolution (hereinafter referred to as "JPEG for Preview"). On the other hand, although omitted in the drawings, the terminal program 65 ends the data conversion processing without obtaining the specified data in the second format, in response to the obtaining of the error information as the return value for the conversion API called in step S37.

Further, the terminal program 65 ends the data conversion processing without obtaining the specified data in the second format, in response to the determination that the second value "ON" is set in the non-output information (S33: ON). As another example, the terminal program 65 may execute the processing in step S37 and end the data conversion processing, in response to the determination that the second value "ON" is set in the non-output information (S33: ON). Namely, the terminal program 65 may obtain the JPEG for Preview corresponding to the specified data, in response to the specifying of the content data in which the second value "ON" is set in the non-output information, as the specified data.

Furthermore, in a case that the fifth value "Local Preferred" is set in the conversion destination information (S31: Local Preferred) and in response to the determination that the version of the OS 64 is less than the first threshold value (S32: No), or the determination that the specified data includes an non-convertible data (S34: Yes), the terminal program 65 determines whether or not the specified data exceeds the range of processing capability of the server 80 (S38). Similarly, in response to the determination that the fourth value "Server" is set in the conversion destination information (S31: Server), the terminal program 65 executes the processing in step S38 and processings thereafter. The processing in step S38 is an example of a fifth determination processing.

In the embodiment, the terminal program 65 determines whether or not the page number of the specified data, or the file size of the specified data, is less than a threshold value (S38). The threshold value may be set in advance in the terminal program 65, or may be obtained from the server 80 via the communication I/F 55. As another example, the terminal program 65 may determine whether or not the specification of the specified data is a type or kind which cannot be handled by the server 80 (for example, a password-protected PDF, etc.) (S38). Further, in response to the number of page or the file size of the specified data being less than the threshold value, the terminal program 65 determines that the data amount of the specified data is within the range of processing capability of the server 80 (S38: No). In this case, the terminal program 65 causes the server 80 to execute the conversion processing (S39, S40). The processings in steps S39 and S40 are an example of a second conversion processing.

More specifically, the terminal program 65 transmits the conversion instruction information to the server 80 via the communication IN 55 (S39). The conversion instruction information is information instructing the execution of the conversion processing for the specified data, and includes, for example, the specified data and the resolution information indicating the output resolution. Next, in response to the receipt of the JPEG for Printing from the server 80 via the communication I/F 55 (S40: Yes), the terminal program 65 causes the memory 62 to store the JPEG for Printing received from the server 80, and ends the data conversion processing. On the other hand, although omitted in the drawings, the terminal program 65 ends the data conversion processing without obtaining the specified data in the second format, in response to not obtaining of the JPEG for Printing from the server 80 after a predetermined time has elapsed since the transmittance of the conversion instruction information (S40: No).

Further, in response to the page number of the specified data, or the file size of the specified data, being not less than a threshold value, the terminal program 65 determines that the data amount of the specified data exceeds the range of processing capability of the server 80 (S38: Yes). In this case, the terminal program 65 ends the data conversion processing without executing the processings in steps S39 and S40, namely, without obtaining the specified data in the second format. Furthermore, although omitted in the drawings, in a case that the third value "Local" is set in the conversion destination information (S31: Local) and in response to the determination that the version of the OS 64 is less than the first threshold value (S32: No), or in response to the determination that the specified data includes the non-convertible data (S34: Yes), the terminal program 65 may end the data conversion processing without obtaining the specified data in the second format.

Furthermore, although omitted in the drawings, in a case that the third value "Local", or the fifth value "Local Preferred" is set in the conversion destination information, that the determination is made that the version of the OS 64 is not less than the second threshold value, and the determination is made that the first value "OFF" is set in the non-output information (S31: Local/Local Preferred & S32: Yes & S33: OFF), the terminal program 65 may skip the processing in step S34 and may execute the processing in step S35 and the processings thereafter.

Moreover, although omitted in the drawings, the terminal program 65 may further execute a determination whether or not the sever 80 is accessible, prior to the processing in step S38. For example, the terminal program 65 may determine whether or not the communication I/F 55 is operating effectively, whether or not the access to the Internet 101 can be possible via the router 102A, and whether or not it is possible to transmit an echo request to the server 80 via the communication I/F 55 and to receive an echo reply from the server 80 via the communication I/F 55 within a predetermined period of time. Further, in response to the determination made by the terminal program 65 that the server 80 is accessible, the terminal program 65 may execute the processing in step S38 and the processings thereafter. On the other hand, in response to the determination made by the terminal program 65 that the server 80 is not accessible, the terminal program 65 may end the data conversion processing without obtaining the specified data in the second format.

Next, returning to FIG. 4A, the terminal program 65 determines whether or not the JPEG for Printing or the JPEG for Preview has been obtained in the data conversion processing (S14). Further, in response to the determination that the JPEG for Printing or the JPEG for Preview has been obtained (S14: Yes), the terminal program 65 causes the display 53 to display a preview screen indicated in FIG. 6B or in FIG. 7A (S15). Furthermore, the terminal program 65 receives, via the input I/F 54, a user operation by the user with respect to the preview screen (S16). The processing in step S15 is an example of a preview processing, and the processing in step S16 is an example of a first reception processing.

The preview screen include a preview image 121, and a [Print] icon 122. The preview image 121 is an image indicating a state that an image indicated by the specified data is recorded on a sheet. The preview image 121 is generated from the JPEG for Printing or the JPEG for Preview obtained in the data conversion processing. The [Print] icon 121 is an example of an output instructing object corresponding to an execution instruction for a printing operation with respect to the specified data.

A preview screen, in a case that the first value "OFF" is set in the non-output information, includes a [Print] icon 122 which is enabled (made effective), as depicted in FIG. 6B. The [Print] icon 122 which is enabled indicates, for example, a state that in response to an instruction specified via the input I/F 54, a processing corresponding to such instruction can be executed. The processing for displaying the preview screen as depicted in FIG. 6B is an example of a first preview processing.

Figure 7B:
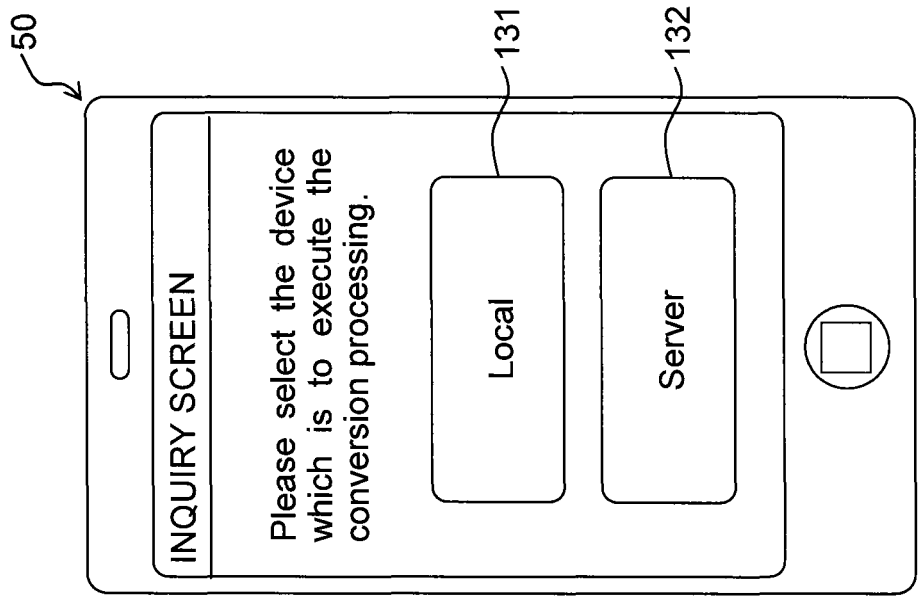
Figure 7A:
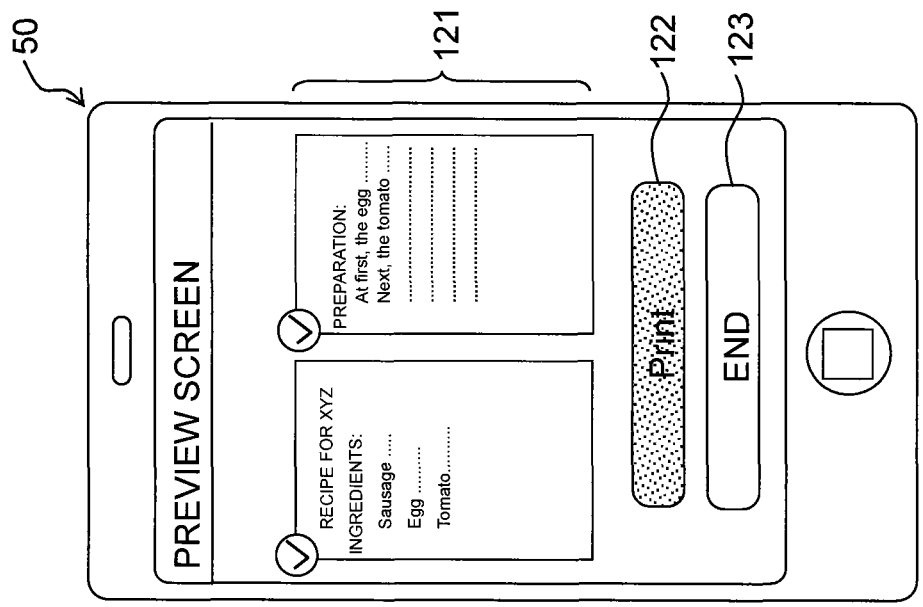

On the other hand, a preview screen, in a case that the second value "ON" is set in the non-output information, is different from the preview screen depicted in FIG. 6B in that the preview screen as depicted in FIG. 7A includes a [Print] icon 122 which is disabled (made ineffective). The [Print] icon 122 which is disabled indicates, for example, a state that even if any instruction is specified with respect to the [Print] icon 122 via the input I/F 54, a processing corresponding to such instruction cannot be executed. Specific examples of disabling the [Print] icon 122 are not limited to displaying the [Print] icon 122 in a gray-out state, and may include making the [Print] icon 122 be hidden from view in the preview screen. Further, the preview screen as depicted in FIG. 7A further includes an [End] icon 123 corresponding to an instruction for ending the displaying of the preview screen. The processing for displaying the preview screen as depicted in FIG. 7A is an example of a second preview processing.

Next, in response to the receipt of the specification of the enabled [Print] icon 122 via the input IN 54 (S16: Yes), the terminal program 65 determines whether or not the JPEG for Printing corresponding to the specified data is stored in the memory 62 (S17). Further, in response to the determination that the JPEG for Printing is stored (S17: Yes), the terminal program 65 transmits print instruction information to the multi-function peripheral 10 (S20). The processing in step S20 is an example of an output processing.

The print instruction information is an example of output instruction information instructing the execution of a printing operation with respect to the specified data in the second format. The print instruction information includes the JPEG for Printing, namely the specified data in the second format. The user operation for tapping the enabled [Print] icon 122 is an example of an instructing operation corresponding to the instruction for outputting the specified data. On the other hand, although omitted in the drawings, the apparatus program 35 of the multi-function peripheral 10 receives the print instruction information from the terminal apparatus 50 via the communication I/F 25. Further, the apparatus program 35 causes the printer 11 to execute a printing operation according to the received print instruction information. Namely, the printer 11 records an image, on the sheet, which is indicated by the specified data in the second format included in the print instruction information.

As another example, the terminal program 65 may transmits, via the communication I/F 55, FAX instruction information to the multi-function peripheral 10 (S20). The FAX instruction information is information instructing the execution of a FAX transmitting operation with respect to the specified data in the second format. The FAX instruction information includes the specified data in the second format and a FAX number identifying an external device or apparatus as a FAX transmission destination. On the other hand, the apparatus program 35 receives the FAX instruction information from the terminal apparatus 50 via the communication I/F 25. Further, the apparatus program 35 causes the FAX section 13 to execute FAX transmission of the specified data in the second format, which is included in the received FAX instruction information, with respect to the external device identified by the FAX number.

Furthermore, in response to the determination that the JPEG for Printing, corresponding to the specified data, is not stored (S17: No), the terminal program 65 causes the server 80 to execute the conversion processing (S18, S19). The processings in steps S18 and S19 are an example of a second conversion processing, and may be similar to the processings in steps S39 and S40. Moreover, in response to the receipt of the JPEG for Printing from the server 80 via the communication I/F 55 (S19: Yes), the terminal program 65 executes the processing in step S20 by using the JPEG for printing. The processings in steps S18 to S20 are executed, for example, in a case that the fifth value "Local Preferred" is set to the conversion destination information and that the JPEG for Preview is obtained in step S37.

On the other hand, in response to not receiving the JPEG for Printing from server 80 in step S19 (S19: No), or in response to not being capable of receiving the JPEG for Printing or JPEG for Preview in the data conversion processing (S14: No), the terminal program 56 causes the display 53 to display a non-illustrated error screen (S21). The error screen is a screen notifying that the processing in step S20 cannot be executed. The error screen includes, for example, a message notifying that the JPEG for Printing cannot be received from the server 80 (S19: No/S40: No), that the capacity of the memory required for the conversion processing is not sufficient (is in shortage) (S36: No), etc. The processing in step S21 is an example of a notification processing. Further, although omitted in the drawings, in response to the receipt of the specification of the [End] icon 123 depicted in FIG. 7A via the input I/F 54, the terminal program 65 ends the print instruction processing without executing the processing in step S17 and the processings thereafter.

[Effects of the Embodiment]

The function implemented in the OS 64 is increased accompanying the version upgrade (version-up), etc. of the OS 64. In the embodiment, the OS 64 of which version is less than the first threshold value does not have the conversion function, and the OS 64 of which version is not less than the first threshold value has the conversion function. Further, in a case of causing the server 80 to execute the conversion processing, the transmission between the terminal apparatus 50 and the server 80 takes longer time than the conversion processing itself executed by the server 80.

In view of the above-described situation, the terminal program 65 according to the embodiment causes the OS 64 of the terminal apparatus 50 to execute the conversion processing from the first format into the second format in a case that the conversion function for executing the conversion from the first format into the second format is implemented in the OS 64, whereas the terminal program 65 causes the server 80 to execute the conversion processing in a case that the conversion function is not implemented in the OS 64. With this, the communications traffic between the terminal apparatus 50 and the server 80 can be reduced, thereby making it possible to efficiently execute a series of operations for converting and outputting the specified data.

Further, some applications which generate or edit the specified data are capable of including, in the specified data, a non-convertible data which cannot be converted into the second format in the OS 64. In view of such a situation, it is preferred that the server 80 is allowed to convert the specified data including the non-convertible data, as in the above-described embodiment. Further, the conversion processing requires the capacity of the memory to a certain extent. Accordingly, in a case that the available capacity of the memory 62 becomes short (is reduced to be small) during the conversion processing, it is preferred that the conversion processing is stopped, and the server 80 is allowed to execute the conversion processing.

Note that the capacity of the memory required for the third conversion processing is smaller than that required for the first conversion processing. Further, any serious problem will not be caused if the specified data displayed in the display 53 in the preview processing has a resolution that is lower than the resolution of the specified data displayed in the display 53 in the output instruction processing. In view of this, in the embodiment, the OS 64 is caused to generate the JPEG for Preview; and the server 80 is caused to generate the JPEG for Output in response to the tapping of the [Print] icon 122. By doing so, it is possible to suppress the lowering in throughput as the entire processing.

On the other hand, with respect to a specified data in which the second value "ON" is set to the non-output information due to a reason, for example, security, etc., it is preferred that the output instruction processing is not executed, as in the above-described embodiment, even if the OS 64 is capable of executing the conversion processing. Note that in a case that the second value "ON" is set to the non-output information, the JPEG for Preview may be generated to thereby execute the processing up to the second preview processing, or it is allowable to cause the error screen to be displayed without generating the JPEG for Preview.

Further, according to the above-described embodiment, it is determined whether or not the data amount of the specified data exceeds the range of processing capability of the server 80 (S38), prior to the transmittance of the conversion instruction information to the server 80. With this, any transmission, to the server 80, of the specified data exceeding the processing capability of the server 80 is suppressed. Furthermore, the determination as to whether or not the server 80 is accessible is executed prior to the processing in step S38. By doing so, any attempt to transmit the conversion instruction information to the server 80 in the non-accessible state can be suppressed.

Note that the conversion processing by the OS 64 and the conversion processing by the server 80 are different from each other, for example, in the image quality of the specified data after the conversion, in some cases. In view of this, by previously setting a value corresponding to a desired device to the conversion destination information as in the above embodiment, it is possible to easily obtain a result that is desirable for the user. The fifth value "Local Preferred" according to the embodiment corresponds to the instruction for causing the terminal apparatus 50 to execute the conversion processing preferentially to the server 80; it is allowable, however, that a sixth value "Server Preferred" corresponds to an instruction for causing the sever 80 to execute the conversion processing preferentially to the terminal apparatus 50 is set to the conversion destination information.

Although omitted in the drawings, in response to the determination that the sixth value "Sever Preferred" is set to the conversion destination information, the terminal program 65 may execute the determination as to whether or not the server 80 is accessible and may execute the processing in step S38. Then, in response to a determination that the server 80 is accessible and a determination that the data amount of the specified data is within the range of processing capability of the server 80 (S38: No), the terminal program 65 may execute the processing in step S39 and the processing(s) thereafter.

On the other hand, in response to a determination that the server 80 is not accessible or a determination that the data amount of the specified data exceeds the range of processing capability of the server 80 (S38: Yes), the terminal program 65 may execute the processing in step S32 and the processings thereafter. Further, in such a case, in response to the determination that the version of the OS 64 is less than the first threshold value (S32: No), or the determination that the specified data includes a non-convertible data (S34: Yes), the terminal program 65 may end the data conversion processing without obtaining the specified data in the second format.

Further, in response to the determination that the OS 64 is capable of executing the conversion processing (S32: Yes), the terminal program 65 may cause the display 53 to display an inquiry screen as depicted in FIG. 7B. The inquiry screen is a screen inquiring which one of the terminal apparatus 50 and the server 80 is to execute the conversion processing. The inquiry screen includes a message "Please select the device which is to execute the conversion processing", a [Local] icon 131 corresponding to the terminal apparatus 50, and a [Server] icon 132 corresponding to the server 80. The terminal program 65 may receive, via the input I/F 54, a user operation by the user with respect to the inquiry screen.

Further, in response to the receipt of a specification (identification) of the [Local] icon 131 via the input I/F 54, the terminal program 65 may execute the processing in step S33 and the processings thereafter. On the other hand, in response to the receipt of a specification (identification) of the [Server] icon 132 via the input I/F 54, the terminal program 65 may execute the determination whether or not the server 80 is accessible or may execute the processing in step S38. The tapping of the [Local] icon 131 is an example of a first operation, and the tapping of the [Server] icon 132 is an example of a second operation. Furthermore, a processing of receiving the first operation or the second operation via the input I/F 54 is an example of a second reception processing.

Moreover, the method of determining whether or not the conversion function is implemented in the OS 64 (S32) is not limited to the comparison of the version of the OS 64 with the threshold value, and the determining method may be performed by calling an API to make inquiry to the OS 64, or by making inquiry to a non-illustrated server on the Internet 101. Further, a portion of each of the determination processings in steps S31 to S34 in FIG. 5A may be omitted, or the execution order of the determination processings in steps S31 to S34 may be exchanged. Note that, however, since step S34 analyzing the specified data takes longer time than the other determination processings, it is desired that step S34 is executed after executing the other determination processings. Furthermore, in a case that the fourth value "Server" or the sixth value "Server Preferred" is set to the conversion destination information, it is not necessary to execute the processings of steps S32 to S34. Therefore, it is desired that step S31 is executed first.

Moreover, the terminal program 65 may execute data conversion processing with respect to each of the plurality of pieces of the content data corresponding to the data icons 111 to 113 respectively. Further, the terminal program 65 may add the obtained JPEG for Printing or JPEG for Preview to each of the data icons 111 to 113, rather than the format image thereof. On the other hand, in response to such a situation that either one of the JPEG for Printing and the JPEG for Preview cannot be generated, the terminal program 65 may disable the data icon 111, 112 or 113 corresponding thereto. The processing of causing the display 53 to display the data icons 111 to 113 each of which is added with the JPEG for Printing or JPEG for Preview is an example of the output processing.

As an example, in response to the receipt of an instruction for displaying the data selection screen via the input I/F 54, the terminal program 65 may execute the data conversion processing, prior to causing the display 53 to display the data selection screen. Further, in response to the data conversion processing being ended, the terminal program 65 may cause the display 53 to display a data selection screen including the data icon(s) 111, 112 and/or 113 added with the JPEG for Printing or JPEG for Preview. The above-described configuration allows the user to easily find the data icon(s) 111, 112 and/or 113 corresponding to a desired content data. Further, according to the data conversion processing of the above configuration, since the specified data in the second format can be obtained faster than in the conventional technique, it is possible to shorten the time since the reception of the instruction for displaying the data selection screen until the displaying of the data selection screen.

As another example, in response to the reception of the instruction for displaying the data selection screen via the input I/F 54, the terminal program 65 may cause the display 53 to display the data selection screen as depicted in FIG. 6A. Further, the terminal program 65 may execute the data conversion processing while the data selection screen is being displayed. Furthermore, the terminal program 65 may add the obtained JPEG for Printing or JPEG for Preview to the data icon(s) 111, 112 and/or 113 corresponding thereto, instead of the format image(s) thereof which is (are) being displayed. According to the above-described configuration, the data selection screen including the format image(s) is displayed; and every time the conversion processing is ended for each content data, the format image thereof is replaced with the specified data in the second format. With this, it is possible to further shorten the time since the reception of the instruction for displaying the data selection screen until the displaying of the data selection screen, and to allow the user to easily find the data icon(s) 111, 112 and/or 113 each corresponding to the desired content data.

Further, in the multi-function peripheral 10 and the terminal apparatus 50 of the embodiment, the example in which the respective processings executed by the controller of the present teaching are realized by the execution of the respective kinds of programs, stored in the memory 32 and the memory 62, by the CPU 31 and the CPU 61, respectively. However, the configuration of the controller is not limited to this, and a part or entirety of the configuration of the controller may be realized by hardware such as an integrated circuit, etc.

Furthermore, the present teaching can be realized not only as the multi-function peripheral 10 and the terminal apparatus 50, but may be realized also as a program for causing the multi-function peripheral 10 and the terminal apparatus 50 to execute the processing(s). Moreover, the program may be provided as being stored in a non-transitory recording medium. The non-transitory recording medium may include a CD-ROM, a DVD-ROM, etc., as well as a storage device or memory unit installed in a server which is connectable to the multi-function peripheral 10 and the terminal apparatus 50 via a communication network. Further, the program stored in the storage device of the server may be delivered or distributed as information or signal indicating the program, via the communication network such as the Internet 101.

What is claimed is:

1. A non-transitory computer-readable medium storing a program executable by a terminal apparatus provided with a communication interface, the program causing the terminal apparatus to execute:
   a first determination processing for determining whether an operating system of the terminal apparatus is capable of converting a format of content data from a first format into a second format based on a version of the operation system, the first format being a format for which a data outputting apparatus is incapable of executing an outputting operation for outputting the content data, the second format being a format for which the data outputting apparatus is capable of executing the outputting operation;
   a first conversion processing for causing the operating system to convert the format of the content data from the first format into the second format;
   a second conversion processing for causing a server to convert the format of the content data from the first format into the second format, the server being connected to the terminal apparatus via the communication interface; and
   an output processing for outputting the content data in the second format converted in the first conversion processing or the second conversion processing,
      wherein in the first determination processing, the program causes the terminal apparatus to determine whether the version of the operating system is less than a first threshold value, not less than the first threshold value and less than a second threshold value newer than the first threshold value or not less than the second threshold value,
      in response to a determination made in the first determination processing that the version of the operating system is less than the first threshold value, the program causes the terminal apparatus to:
         determine that the operating system is incapable of converting the format of the content data from the first format into the second format; and execute the second conversion processing;
      in response to a determination made in the first determination processing that the version of the operating system is not less than the first threshold value and less than the second threshold value, the program causes the terminal apparatus to execute a second determination processing for determining whether the content data contains non-convertible data, the non-convertible data being data which is non-convertible by the operating system into the second format in the first conversion processing,
         in response to a determination made in the second determination processing that the content data contains the non-convertible data, the program causes the terminal apparatus to execute the second conversion processing,
         in response to a determination made in the second determination processing that the content data does not contain the non-convertible data, the program causes the terminal apparatus to execute the first conversion processing; and
      in response to a determination made in the first determination processing that the version of the operating system is not less than the second threshold value, the program causes the terminal apparatus to:
         determine that the operating system is capable of converting the format of the content data from the first format to the second format; and
         execute the first conversion processing without executing the second determination processing.

2. The medium according to claim 1,
wherein the terminal apparatus further comprises a memory,
the operating system develops the content data in the memory in the first conversion processing so as to convert the format of the content data from the first format into the second format, and
the program causes the terminal apparatus to stop the first conversion processing and execute the second conversion processing, in response to occurrence of shortage in capacity of the memory during the first conversion processing.

3. The medium according to claim 1,
wherein the content data is associated with non-output information to which a first value or a second value is set as a set value, the first value corresponding to an instruction for allowing the outputting operation with respect to the content data, the second value corresponding to an instruction for restricting the outputting operation with respect to the content data,
the program causes the terminal apparatus to execute a third determination processing for determining the set value of the non-output information,
the program causes the terminal apparatus to execute the first conversion processing and the output processing, in response to a determination made in the first determination processing that the operating system is capable of converting the format of the content data from the first format into the second format and to a determination made in the third determination processing that the first value is set to the non-output information, and
the program does not cause the terminal apparatus to execute the output processing, in response to a determination made in the third determination processing that the second value is set to the non-output information.

4. The medium according to claim 3,
wherein the terminal apparatus further comprises an input interface and a display, and
the program further causes the terminal apparatus to execute:
   a first preview processing for causing the display to display a preview screen including a preview image, which is indicated by the content data in the second format, and an output instructing object which is enabled, in response to the determination made in the third conversion processing that the first value is set to the non-output information,
   a second preview processing for causing the display to display the preview screen in which the output instructing object is disabled, in response to the determination made in the third determination processing that the second value is set to the non-output information, and
   a first reception processing for receiving, via the input interface, a user operation for specifying the output instructing object; and
the program causes the terminal apparatus to execute the output processing, in response to receipt, in the first reception processing, of the user operation for specifying the enabled output instructing object in the first reception processing.

5. The medium according to claim 1,
wherein the terminal apparatus further comprises a memory,
the memory stores conversion destination information to which a third value or a fourth value is set as a set value, the third value corresponding to an instruction for executing the first conversion processing, the fourth value corresponding to an instruction for executing the second conversion processing,
the program further causes the terminal apparatus to execute a fourth determination processing for determining the set value of the conversion destination information, and
the program causes the terminal apparatus to execute the first determination processing, in responses to a determination made in the fourth determination processing that the third value is set to the conversion destination information, and
the program causes the terminal apparatus to execute the second conversion processing while skipping the first determination processing, in response to a determination made in the fourth determination processing that the fourth value is set to the conversion destination information.

6. The medium according to claim 5,
wherein the terminal apparatus further comprises a notifying section,
a fifth value, corresponding to an instruction for executing the first conversion processing preferentially to the second conversion processing, is settable to the conversion destination information,
the program further causes the terminal apparatus to execute a notification processing for causing the notifying section to notify that the output processing with respect to the content data is non-executable, in response to a determination made in the first determination processing that the operating system is incapable of converting the format of the content data from the first format into the second format and to the determination made in the fourth determination processing that the third value is set to the conversion destination information, and
the program causes the terminal apparatus to execute the second conversion processing, in response to the determination made in the first determination processing that the operating system is incapable of converting the format of the content data from the first format into the second format and to a determination made in the fourth determination processing that the fifth value is set to the conversion destination information.

7. The medium according to claim 5,
wherein a sixth value, corresponding to an instruction for executing the second conversion processing preferentially to the first conversion processing, is settable to the conversion destination information,
the program further causes the terminal apparatus to execute a fifth determination processing for determining whether data amount of the content data exceeds a range of processing capability of the server, in response to a determination made in the fourth determination processing that the sixth value is set to the conversion destination information,
the program causes the terminal apparatus to execute the second conversion processing, in response to a determination made in the fifth determination processing that the data amount is within the range of the processing capability of the server, and
the program causes the terminal apparatus to execute the first conversion processing, in response to a determination made in the fifth determination processing that the data amount exceeds the range of the processing capability of the server.

8. The medium according to claim 1,
wherein the terminal apparatus further comprises an input interface,
the program further causes the terminal apparatus to execute a second reception processing for receiving, via the input interface, a first operation corresponding to the first conversion processing or a second operation corresponding to the second conversion processing, in response to a determination made in the first determination processing that the operating system is capable of converting the format of the content data from the first format into the second format,
the program causes the terminal apparatus to execute the first conversion processing, in response to reception of the first operation in the second reception processing, and
the program causes the terminal apparatus to execute the second conversion processing, in response to reception of the second operation in the second reception processing.

9. A non-transitory computer-readable medium storing a program executable by a terminal apparatus provided with a communication interface, the program causing the terminal apparatus to execute:
a first determination processing for determining whether an operating system of the terminal apparatus is capable of converting a format of content data from a first format into a second format, the first format being a format for which a data outputting apparatus is incapable of executing an outputting operation for outputting the content data, the second format being a format for which the data outputting apparatus is capable of executing the outputting operation;
a first conversion processing for causing the operating system to convert the format of the content data from the first format into the second format, in response to a convertible determination made in the first determination processing that the operating system is capable of converting the format of the content data from the first format into the second format;
a second conversion processing for causing a server to convert the format of the content data from the first format into the second format, in response to a non-convertible determination made in the first determination processing that the operating system is incapable of converting the format of the content data from the first format into the second format, the server being connected to the terminal apparatus via the communication interface; and
an output processing for outputting the content data in the second format converted in the first conversion processing or the second conversion processing,
wherein the terminal apparatus further comprises a memory,
the operating system develops the content data in the memory in the first conversion processing so as to convert the format of the content data from the first format into the second format, and the program causes the terminal apparatus to stop the first conversion processing and execute the second conversion processing, in response to occurrence of shortage in capacity of the memory during the first conversion processing wherein the terminal apparatus further comprises an input interface and a display, each of the first conversion processing and the second conversion processing is a processing for converting the content data in the first format into the content data which is in the second format and which indicates an image having output resolution, the program causes the terminal apparatus to stop the first conversion processing and execute a third conversion processing for converting the content data in the first format into the content data which is in the second format and which indicates an image having preview resolution lower than the output resolution, in response to the occurrence of shortage in the capacity of the memory during the first conversion processing, and the program causes the terminal apparatus to execute:
   a preview processing for causing the display to display a preview image indicated by the content data converted in the third conversion processing;
   a first reception processing for receiving, via the input interface, an instructing operation corresponding to an instruction for outputting the content data; and
   the second conversion processing and the output processing, in response to reception of the instructing operation in the first reception processing.

10. A terminal apparatus comprising:
a communication interface; and
a controller configured to execute:
   a first determination processing for determining whether an operating system of the terminal apparatus is capable of converting a format of content data from a first format into a second format based on a version of the operating system, the first format being a format for which a data outputting apparatus is incapable of executing an outputting operation for outputting the content data, the second format being a format for which the data outputting apparatus is capable of executing the outputting operation;
   a first conversion processing for causing the operating system to convert the format of the content data from the first format into the second format;
   a second conversion processing for causing a server to convert the format of the content data from the first format into the second format, the server being connected to the terminal apparatus via the communication interface; and
   an output processing for outputting the content data in the second format converted in the first conversion processing or the second conversion processing, wherein in the first determination processing, the controller is configured to determine whether the version of the operating system is less than a first threshold value, not less than the first threshold value and less than a second threshold value newer than the first threshold value or not less than the second threshold value, in response to a determination made in the first determination processing that the version of the operating system is less than the first threshold value, the controller is configured to:
   determine that the operating system is incapable of converting the format of the content data from the first format into the second format; and execute the second conversion processing;

in response to a determination made in the first determination processing that the version of the operating system is not less than the first threshold value and less than the second threshold value, the controller is configured to execute a second determination processing for determining whether the content data contains non-convertible data, the non-convertible data being data which is non-convertible by the operating system into the second format in the first conversion processing, in response to a determination made in the second determination processing that the content data contains the non-convertible data, the controller is configured to execute the second conversion processing, in response to a determination made in the second determination processing that the content data does not contain the non-convertible data, the controller is configured to execute the first conversion processing; and in response to a determination made in the first determination processing that the version of the operating system is not less than the second threshold value, the controller is configured to:
   determine that the operating system is capable of converting the format of the content data from the first format to the second format; and
   execute the first conversion processing without executing the second determination processing.

11. A terminal apparatus comprising:
an input interface;
a display;
a memory;
a communication interface; and
a controller configured to execute:
   a first determination processing for determining whether an operating system of the terminal apparatus is capable of converting a format of content data from a first format into a second format, the first format being a format for which a data outputting apparatus is incapable of executing an outputting operation for outputting the content data, the second format being a format for which the data outputting apparatus is capable of executing the outputting operation;
   a first conversion processing for causing the operating system to convert the format of the content data from the first format into the second format, in response to a convertible determination made in the first determination processing that the operating system is capable of converting the format of the content data from the first format into the second format;
   a second conversion processing for causing a server to convert the format of the content data from the first format into the second format, in response to a non-convertible determination made in the first determination processing that the operating system is incapable of converting the format of the content data from the first format into the second format, the server being connected to the terminal apparatus via the communication interface; and
   an output processing for outputting the content data in the second format converted in the first conversion processing or the second conversion processing, wherein the operating system develops the content data in the memory in the first conversion processing so as to convert the format of the content data from the first format into the second format, and the controller is configured to stop the first conversion processing and execute the second conversion processing, in response to occurrence of shortage in capacity of the memory during the first conversion processing, wherein each of the first conversion processing and the second conversion processing is a processing for converting the content data in the first format into the content data which is in the second format and which indicates an image having output resolution, wherein the controller is configured to stop the first conversion processing and execute a third conversion processing for converting the content data in the first format into the content data which is in the second format and which indicates an image having preview resolution lower than the output resolution, in response to the occurrence of shortage in the capacity of the memory during the first conversion processing, and the controller is configured to execute:
  a preview processing for causing the display to display a preview image indicated by the content data converted in the third conversion processing;
  a first reception processing for receiving, via the input interface, an instructing operation corresponding to an instruction for outputting the content data; and
  the second conversion processing and the output processing, in response to reception of the instructing operation in the first reception processing.

12. A non-transitory computer-readable medium storing a program executable by a terminal apparatus provided with a communication interface, the program causing the terminal apparatus to execute:
  a first determination processing for determining whether an operating system of the terminal apparatus is capable of converting a format of content data from a first format into a second format, the first format being a format for which a data outputting apparatus is incapable of executing an outputting operation for outputting the content data, the second format being a format for which the data outputting apparatus is capable of executing the outputting operation;
  a first conversion processing for causing the operating system to convert the format of the content data from the first format into the second format, in response to a convertible determination made in the first determination processing that the operating system is capable of converting the format of the content data from the first format into the second format;
  a second conversion processing for causing a server to convert the format of the content data from the first format into the second format, in response to a non-convertible determination made in the first determination processing that the operating system is incapable of converting the format of the content data from the first format into the second format, the server being connected to the terminal apparatus via the communication interface; and
  an output processing for outputting the content data in the second format converted in the first conversion processing or the second conversion processing,
wherein the content data is associated with non-output information to which a first value or a second value is set as a set value, the first value corresponding to an instruction for allowing the outputting operation with respect to the content data, the second value corresponding to an instruction for restricting the outputting operation with respect to the content data, the program causes the terminal apparatus to execute a third determination processing for determining the set value of the non-output information, the program causes the terminal apparatus to execute the first conversion processing and the output processing, in response to the convertible determination made in the first determination processing and to a determination made in the third determination processing that the first value is set to the non-output information, and the program does not cause the terminal apparatus to execute the output processing, in response to a determination made in the third determination processing that the second value is set to the non-output information.

13. A non-transitory computer-readable medium storing a program executable by a terminal apparatus provided with a communication interface, the program causing the terminal apparatus to execute:
  a first determination processing for determining whether an operating system of the terminal apparatus is capable of converting a format of content data from a first format into a second format, the first format being a format for which a data outputting apparatus is incapable of executing an outputting operation for outputting the content data, the second format being a format for which the data outputting apparatus is capable of executing the outputting operation;
  a first conversion processing for causing the operating system to convert the format of the content data from the first format into the second format;
  a second conversion processing for causing a server to convert the format of the content data from the first format into the second format, the server being connected to the terminal apparatus via the communication interface; and
  an output processing for outputting the content data in the second format converted in the first conversion processing or the second conversion processing,
wherein the terminal apparatus further comprises a memory, the memory stores conversion destination information to which a third value or a fourth value is set as a set value, the third value corresponding to an instruction for executing the first conversion processing, the fourth value corresponding to an instruction for executing the second conversion processing, the program further causes the terminal apparatus to execute a fourth determination processing for determining the set value of the conversion destination information, and the program causes the terminal apparatus to execute the first determination processing, in responses to a determination made in the fourth determination processing that the third value is set to the conversion destination information, and the program causes the terminal apparatus to execute the second conversion processing while skipping the first determination processing, in response to a determination made in the fourth determination processing that the fourth value is set to the conversion destination information, wherein the terminal apparatus further comprises a notifying section, a fifth value, corresponding to an instruction for executing the first conversion processing preferentially to the second conversion processing, is settable to the conversion destination information, the program further causes the terminal apparatus to execute a notification processing for causing the notifying section to notify that the output processing with respect to the content data is non-executable, in response to the non-convertible determination made in the first determination processing and to the determination made in the fourth determination processing that the third value is set to the conversion destination information, and the program causes the terminal apparatus to execute the second conversion processing, in response to the non-convertible determination made in the first determination processing and to a determination made in the fourth determination processing that the fifth value is set to the conversion destination information.

* * * * *